US008964331B2

United States Patent
Sugiyama et al.

(10) Patent No.: US 8,964,331 B2
(45) Date of Patent: Feb. 24, 2015

(54) PERPENDICULAR MAGNETIC WRITE HEAD HAVING A MAIN MAGNETIC WRITE POLE PORTION AND A MAGNETIC SUB-POLE PORTION CONFIGURED FOR INCREASED MAGNETIC WRITE FIELD

(75) Inventors: Mikito Sugiyama, Odawara (JP); Kazuhiko Hosomi, Fujisawa (JP); Kaori Suzuki, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 19 days.

(21) Appl. No.: 13/530,027

(22) Filed: Jun. 21, 2012

(65) Prior Publication Data

US 2013/0342937 A1     Dec. 26, 2013

(51) Int. Cl.
*G11B 5/31*     (2006.01)

(52) U.S. Cl.
USPC .................................. 360/125.1; 360/125.14

(58) Field of Classification Search
CPC .. G11B 5/1278; G11B 5/3116; G11B 5/3143; G11B 5/3146
USPC .......................................... 360/125.1, 125.14
See application file for complete search history.

(56) References Cited

U.S. PATENT DOCUMENTS

| | | | |
|---|---|---|---|
| 4,807,076 A | 2/1989 | Nakashima et al. | |
| 6,122,144 A | 9/2000 | Chang et al. | |
| 7,428,123 B2 | 9/2008 | Kameda | |
| 7,580,222 B2 | 8/2009 | Sasaki et al. | |
| 7,692,893 B2 | 4/2010 | Nikitin et al. | |
| 7,881,012 B2 | 2/2011 | Mochizuki et al. | |
| 7,924,528 B2 | 4/2011 | Sasaki et al. | |
| 8,179,636 B1 * | 5/2012 | Bai et al. | 360/125.17 |
| 2003/0137779 A1 * | 7/2003 | Santini et al. | 360/126 |
| 2004/0218307 A1 | 11/2004 | Kuroda et al. | |
| 2005/0259357 A1 * | 11/2005 | Kameda | 360/126 |
| 2005/0280938 A1 * | 12/2005 | Sasaki et al. | 360/126 |
| 2006/0002016 A1 * | 1/2006 | Nikitin et al. | 360/125 |
| 2006/0139801 A1 * | 6/2006 | Kamada | 360/125 |
| 2009/0290257 A1 | 11/2009 | Kimura et al. | |
| 2010/0149688 A1 | 6/2010 | Le et al. | |
| 2010/0277832 A1 * | 11/2010 | Bai et al. | 360/125.03 |

\* cited by examiner

*Primary Examiner* — Craig A. Renner
(74) *Attorney, Agent, or Firm* — Zilka-Kotab, PC

(57) ABSTRACT

A magnetic write head having a main magnetic write pole and a magnetic sub-pole that are configured to maximize magnetic performance. The main magnetic write pole has a flared portion located near the air bearing surface and a non-flared portion removed from the air bearing surface. A magnetic sub-pole is formed adjacent to the main magnetic write pole and terminates at a front endpoint that is recessed from the air bearing surface but is closer to the air bearing surface than the non-flared portion.

8 Claims, 21 Drawing Sheets

PERPENDICULAR MAGNETIC WRITE HEAD HAVING A MAIN MAGNETIC WRITE POLE PORTION AND A MAGNETIC SUB-POLE PORTION CONFIGURED FOR INCREASED MAGNETIC WRITE FIELD

FIELD OF THE INVENTION

The present invention relates to magnetic data recording and more particularly to a write head having a novel magnetic pole structure for improved data rate and data density.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

Disk drive systems are expected to serve as inexpensive and secure storage devices for digital data generated in large volumes in offices and homes. Furthermore, IT infrastructures employing virtual data storage such as cloud computing is becoming more efficient, and there is a demand for higher speed data transfer in order to process large volumes of data via such networks. In this respect, disk drives have been made to respond to these demands with increased areal recording density produced by smaller recording bits, and also increased disk rotation speed and increased recording reproduction frequency. The element size of recording heads for carrying out disk drive recording operations has become smaller as bits have become smaller, while it remains technically difficult to achieve adequate field strength for recording. Furthermore, the recording frequency at the outer periphery of a disk in a 7200 rpm, 3.5 inch disk drive, for example reaches 1 GHz, and there is a problem in that the responsiveness of the recording head with respect to the applied current to the write coil causes increased recording errors at the outer periphery of the disk.

SUMMARY OF THE INVENTION

The present invention provides a magnetic write head that includes a main magnetic write pole that extends to an air bearing surface and that has a flared portion near the air bearing surface and a non-flared portion away from the air bearing surface. The magnetic write head also includes a magnetic sub pole adjacent to the main magnetic write pole that terminates at an endpoint that is recessed from the air bearing surface, but that is closer to the air bearing surface than is the non-flared portion of the main magnetic write pole.

This placement of the endpoint of the magnetic sub-pole greatly enhances the flow of magnetic flux to the tip of the write pole and prevents the loss of magnetic flux. The present invention is intended to restrict the phenomenon of increased recording errors together with increased recording frequency which occurs with recording in the outer peripheral region of a magnetic medium in a hard disk drive system.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
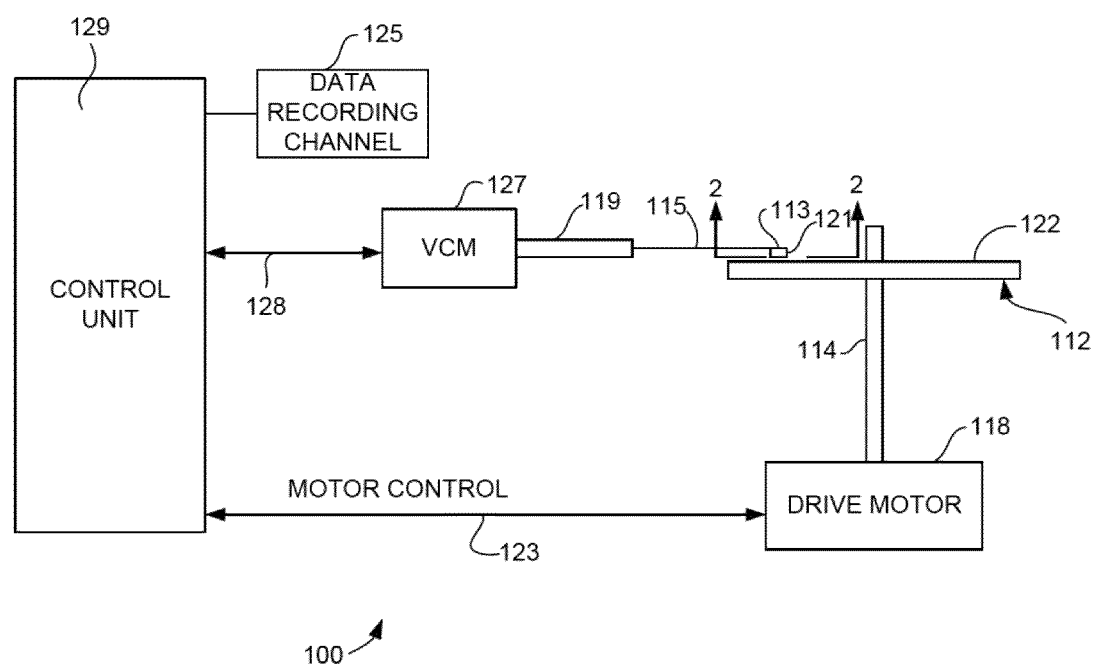
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
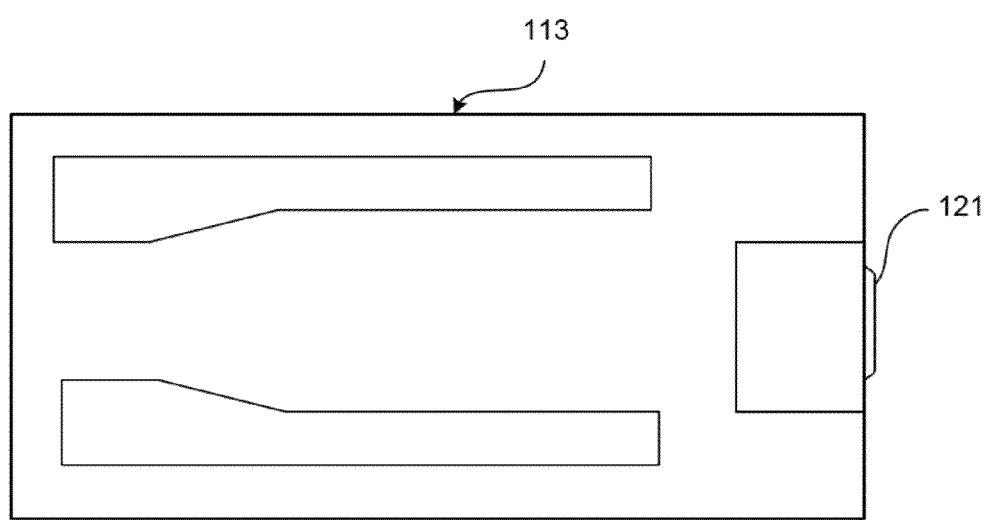
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
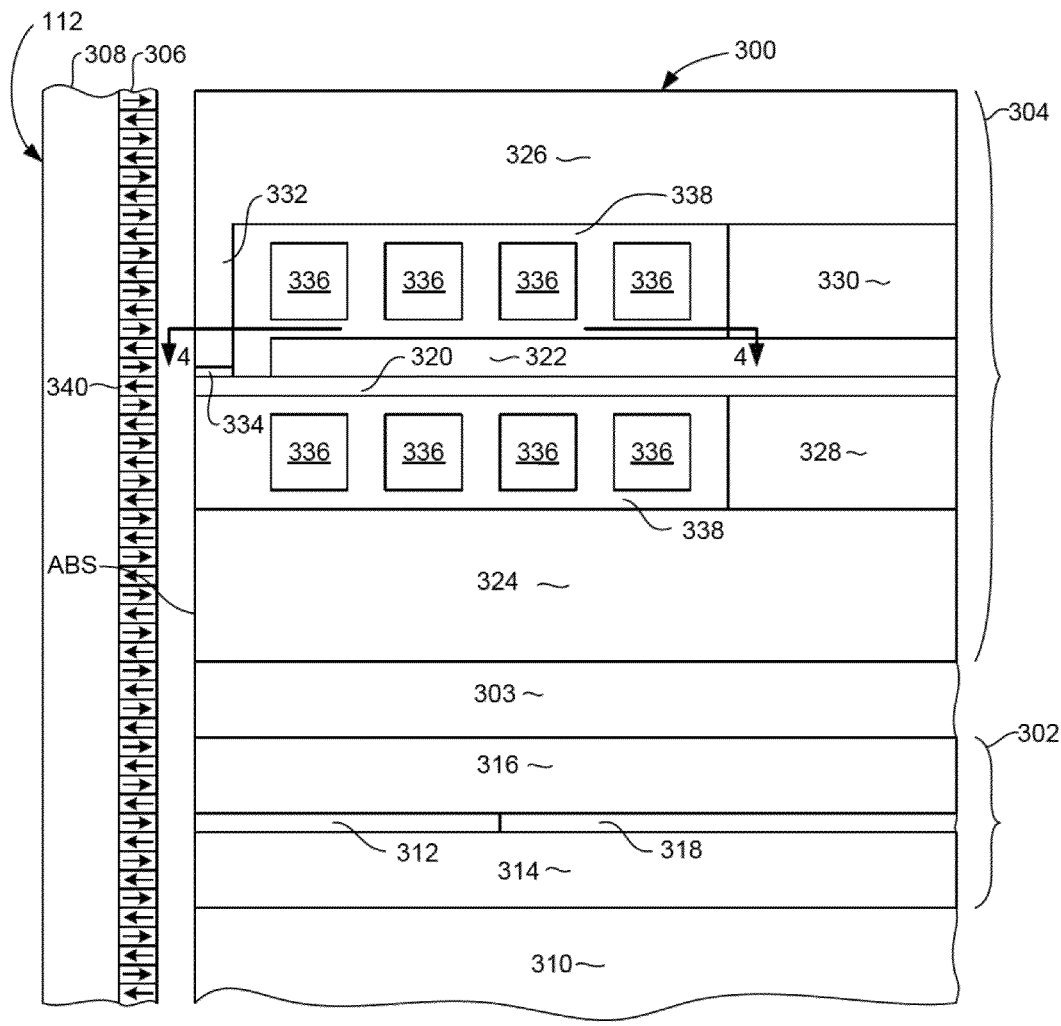
FIG. 3 is a side, cross sectional view of a magnetic head according to an embodiment of the invention.

FIG. 3 shows a magnetic head 300 that can be used in a disk drive system such as the disk drive 100 illustrated in FIG. 1. The head 300 includes a read element 302 and a write element 304. The head 300 has an air bearing surface ABS that faces the magnetic media 112, the magnetic media 112 having a magnetically hard recording layer 306 for recording data and a magnetically softer under-layer 308 formed under the top, recording layer 306. The read element 302 and write element 304 can be formed on a substrate 310 that can be a slider body, which can be constructed of a hard, non-magnetic material such as TiC. A non-magnetic, electrically insulating separation layer 303 may be provided between the read element 302 and write element 304 to separate them from one another.

The read element 302 can include a magnetic sensor 312 such as giant magnetoresistive (GMR) sensor or a tunnel junction magnetoresistive sensor (TMR). The sensor element can be sandwiched between first and second magnetic, electrically conductive shields 314, 316, and the space between the shields 314, 316 that is not consumed by the sensor can be filled with a non-magnetic, electrically insulating fill material such as alumina 318.

The write element 304 includes a main magnetic write pole 320 that extends to the air bearing surface ABS. The main magnetic write pole 320 can be constructed of a magnetic material, but is preferably constructed as a lamination of magnetic layers separated by thin non-magnetic layers. A magnetic sub-pole 322 is formed over and magnetically connected the main magnetic write pole 320. The magnetic sub-pole 322 does not extend to the ABS, but, rather, is recessed from the ABS as shown in FIG. 3. The magnetic sub pole 322 has a larger shape than the main magnetic write pole 320, and is preferably constructed of a magnetic material having excellent soft magnetic characteristics even though the magnetic flux density is relatively small. The magnetic sub-pole 322 increases the write field intensity and reduces magnetic flux leakage. The structure of the sub-pole 322 will be described in greater detail herein below.

With continued reference to FIG. 3, the write head 304 can include a leading return pole 324 and may also include a trailing return pole 326. Magnetic back gap layers 328, 330 magnetically connect the return poles 324, 326 with the main magnetic write pole 320 and sub-pole 322 in a region removed from the ABS as shown in FIG. 3. A trailing magnetic shield 332 may also be provided at the ABS in a trailing direction relative to the main magnetic write pole 320, and may be connected with the trailing return pole 326. The trailing magnetic shield 332 is separated from the trailing edge of the main magnetic write pole 320 by a non-magnetic trailing gap layer 334. The trailing shield 332 improves writing performance by increasing the write field gradient.

With continued reference to FIG. 3, the write head 304 also includes a write coil 336, which is shown in cross section in FIG. 3. The write coil 336 can be constructed with a set of lower coil leads that pass beneath the write pole 320 and a set upper coil leads that pass above the write pole 320 as shown in FIG. 3. The upper and lower coils leads can be connected with one another in a region to either side of the write head 304 as will be better illustrated below. The coils 336 can be encased in a non-magnetic, electrically insulating material 338 such as alumina and/or hard baked photoresist.

When an electrical current flows through the coil 336, the resulting magnetic field causes a magnetic flux to flow through the write coil 320 and sub-pole 322. This result in a write field being emitted to toward the magnetic medium 112, which locally magnetizes a magnetic bit 340 on the hard magnetic top layer 306 of the magnetic medium 112. The magnetic write field then travels through the magnetically soft under-layer 308 to return to the return poles 324, 326, where it is sufficiently spread out and weak that it does not erase the previously recorded bit of data.

As discussed above, the sub-pole 322 helps to channel magnetic flux to the main magnetic write pole 320 in order to increase write field strength. The sub-pole 322 has a unique design that maximizes this increase in field strength while minimizing magnetic flux loss and minimizing adjacent track interference. This novel structure for the sub-pole 322 can be better understood with reference to FIG. 4 which shows a top down view of the sub-pole 322 and main magnetic pole 320 as seen from line 4-4 of FIG. 3.

Figure 4:
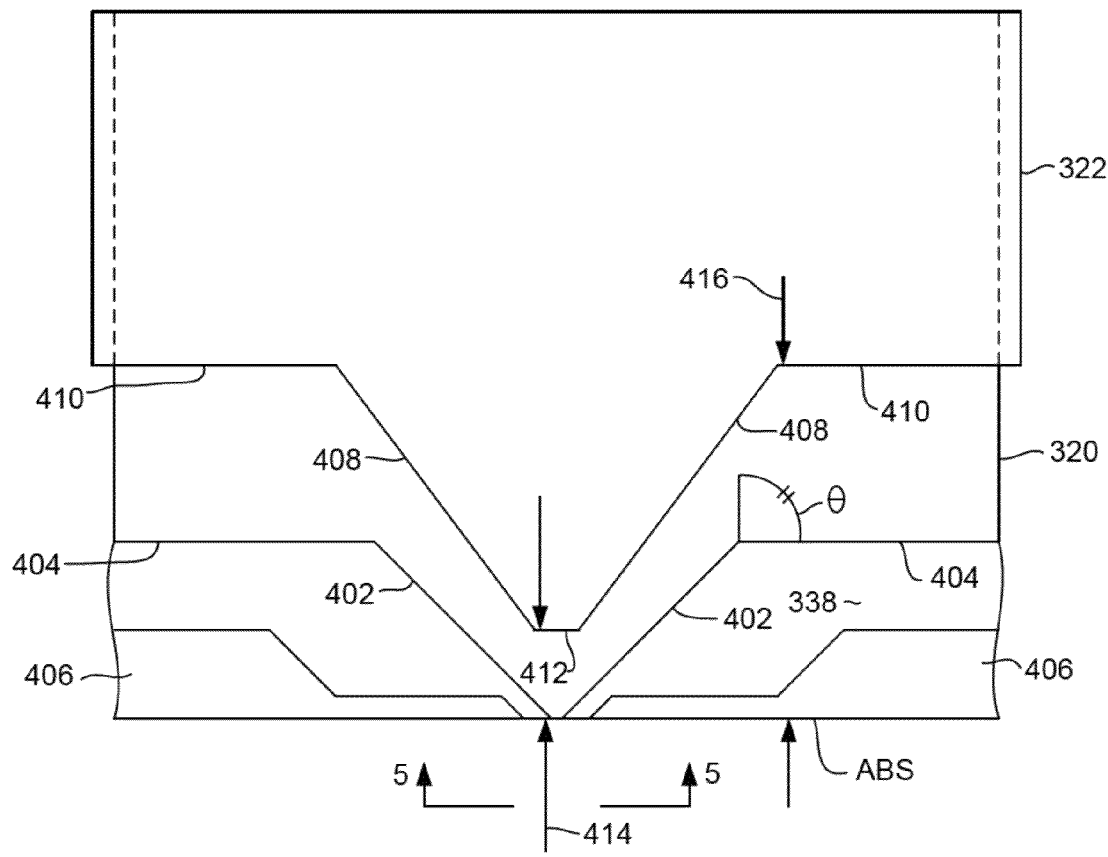
FIG. 4 is a top down view taken from line 4-4 of FIG. 3 showing a main pole and sub-pole of the magnetic head of FIG. 3.

In FIG. 4, the main magnetic write pole 320 extends to the air bearing surface (ABS) and has a flared portion 402 where the front edge (facing the ABS) tapers away from the ABS, and also has a non-flared portion 404 where the write pole does not taper away from the ABS, but has a substantially constant distance from the ABS. Another way to describe this is that in the flared portion 402, the width of the main magnetic write pole 320 increases with increasing distance from the ABS, and in the non-flared portion 404, the width does not change with increasing distance from the ABS.

Figure 5:
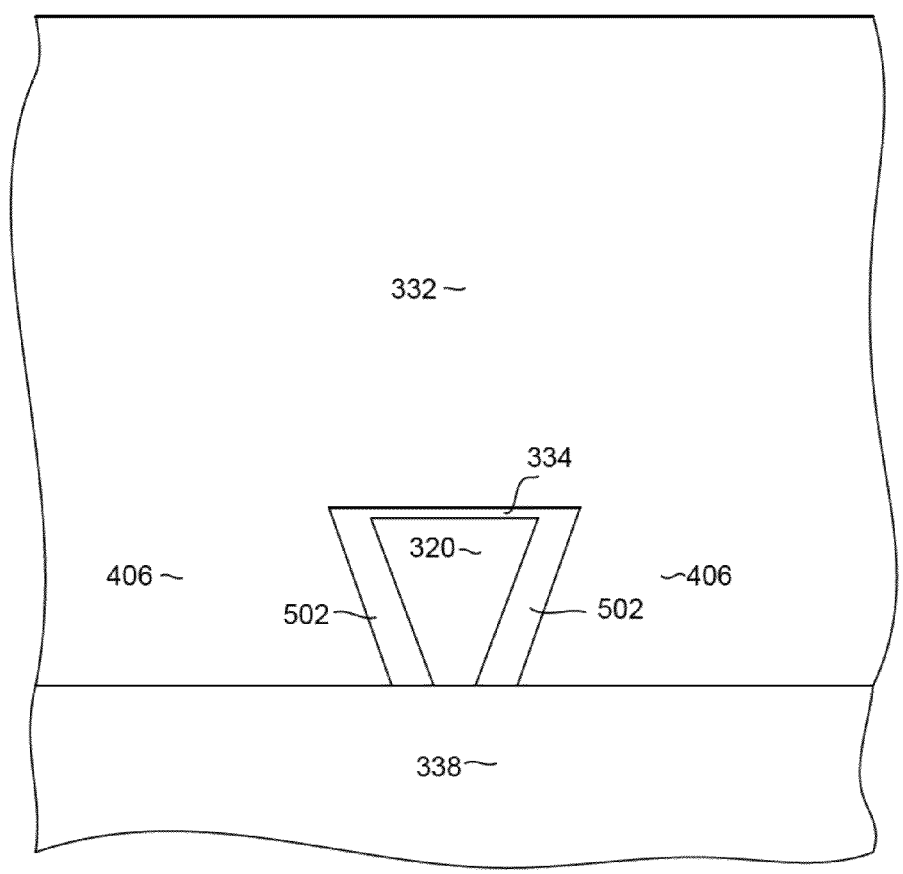
FIG. 5 is an enlarged ABS view of a portion of the magnetic head of FIGS. 3 and 4 as seen from line 5-5 of FIG. 4.

As can be seen in FIG. 4, the main magnetic write pole 320 is embedded in the insulation layer 338 that was previously described above with reference to FIG. 3. FIG. 5 shows an enlarged ABS view as seen from line 5-5 of FIG. 4. As seen in FIG. 5, the tip of the write pole 320 can have a trapezoidal or triangular shape, wherein the cross section of the write pole at the ABS has sides that taper so that the trailing edge is wider than the leading edge. This helps to prevent adjacent track writing when the head is skewed as a result of being located at an inner or outer extreme region of the magnetic disk 112 (FIG. 1). Also as can be seen, the shield 332 can have portions 406 that wrap around the sides of the main magnetic write pole 320 to provide a side shielding function. These side shields portions 406 can be separated from the sides of the write pole 320 by non-magnetic side gap layers 502 as seen in FIG. 5. The side shield portions are seen in cross section in FIG. 4, extending away from the sides of the main magnetic write pole. The trailing portion of the trailing shield 332 is not seen in FIG. 4.

With reference again to FIG. 4, it can be seen that the magnetic sub-pole 322 also has a flared portion 408 and a non-flared portion 410. As with the write pole 320, the flared portion 408 of the sub-pole 322 tapers away from the ABS, having a width that increases with increasing distance from the ABS. Also, as with the main pole 320, the non-flared portion 410 of the sub-pole can be formed so that it does not taper, having a distance from the ABS that is substantially constant and a width that does not change with increasing distance from the ABS.

As seen in FIG. 4, the tapered portion 408 of the sub-pole 322 terminates at a front end 412 that is located at its closest point to the ABS. This front end 412 can have a blunt flat portion as shown in FIG. 4, or could form a point. Also, as seen in FIG. 4, this front end 412 is located within the flared region 402 of the write pole 320. That is to say, as measured relative to its distance from the ABS, the front end 412 is located at a point that is between the ABS and the location of the non-flared portion 404 of the write pole 320. Therefore, the sub-pole end point 412 extends to a point that is closer to the ABS than is the starting point 414 of the flared portion 402 of the main pole 320 (e.g. the point where the main pole 320 changes from flared to non-flared). The inventors have discovered that locating the end point 412 in this location significantly improves write head performance.

In addition, it should be pointed out that, the taper angle of the flared portion 408 of the sub-pole 322 can be different than the taper angle of the flared portion 402 of the main pole 320. For example as shown in FIG. 4, the flared portion 408 of the sub-pole tapers at a steeper angle (relative to the ABS) than the flared portion 402 of the main pole 320.

Figure 15:
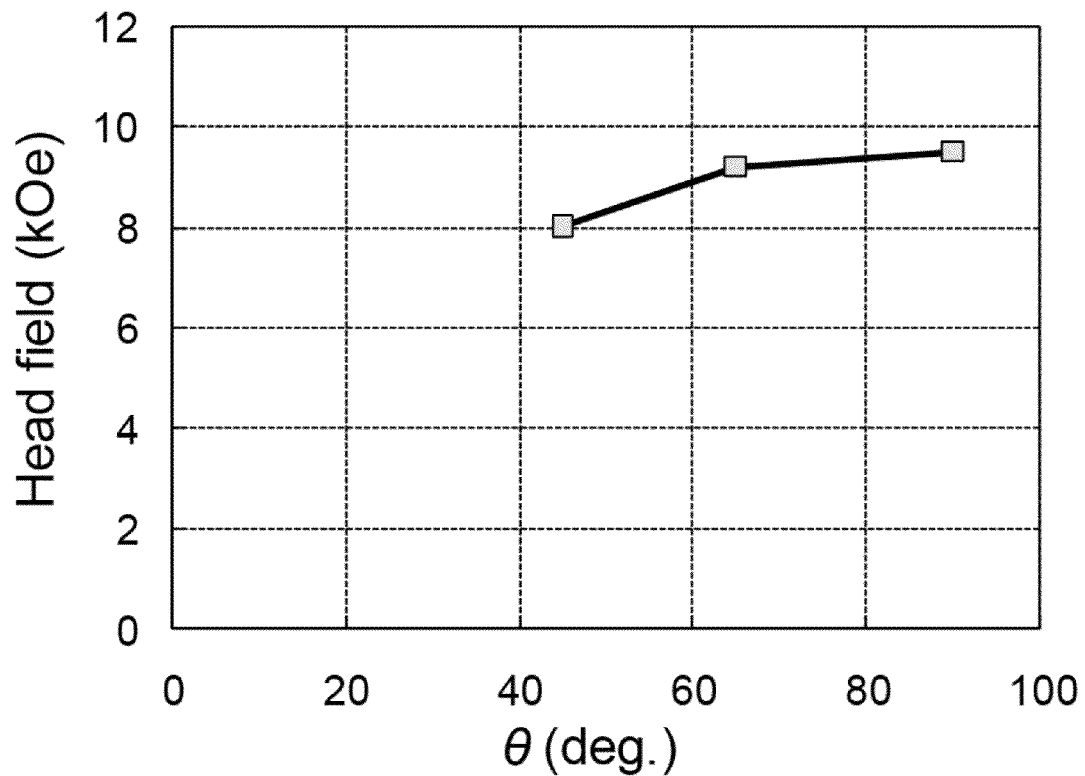
FIG. 15 is a graph illustrating a relationship between sub-pole flare angle and magnetic write field.
Figure 16:
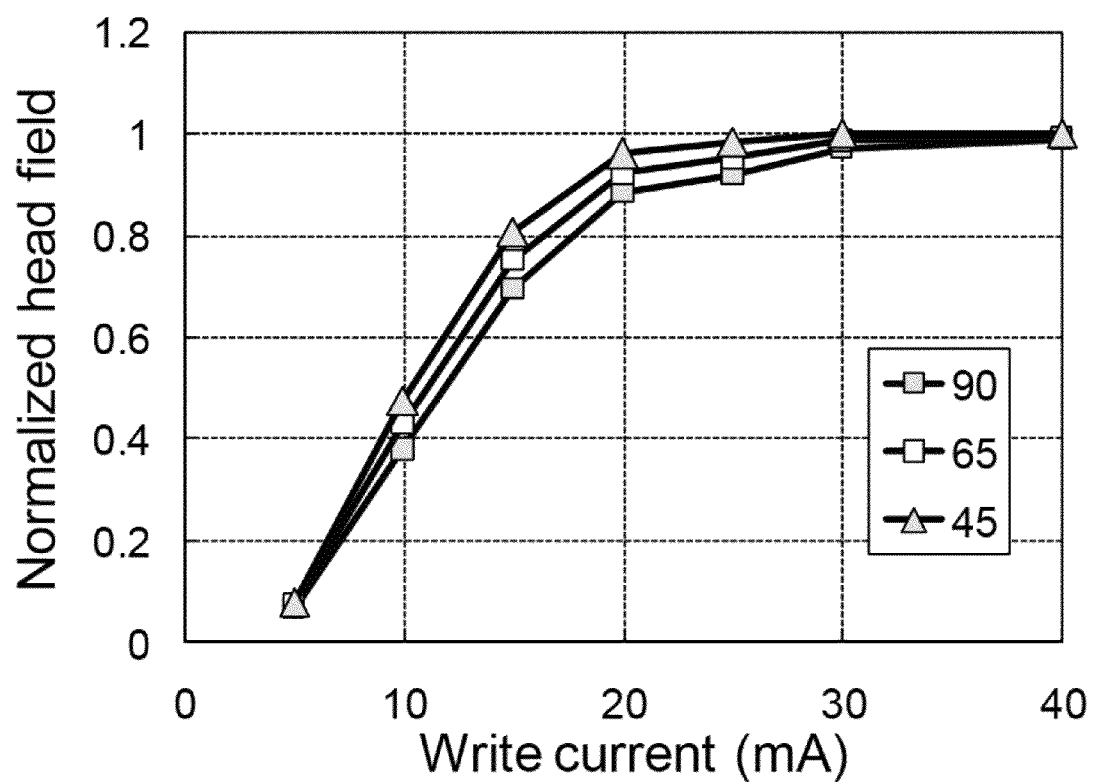
FIG. 16 is a graph illustrating a relationship between write current and normalized write field for magnetic head having different main pole taper angles.

The advantages provided by the novel structure of the present invention can be better understood by the following. In FIG. 4, the starting point of the non-flared portion 404 of the write pole defines an angle of inclination $\theta$ relative to a plane that is perpendicular to the ABS. The results of obtaining the relationship between $\theta$ and the maximum field intensity by means of write field calculation are shown in FIG. 15. The magnetic field increases as $\theta$ increases, and this is advantageous for recording to a recording medium having a high coercive force and excellent thermal stability. The residual magnetization is also likely to be oriented more in the cross-track direction due to the effects of shape anisotropy when $\theta$ increases. As a result, it is possible to inhibit erasure after recording due to residual magnetization. However, this kind of structure produces a deterioration in the responsiveness of the head field to the recording current. FIG. 16 shows the relationship between the head field and the current input to the coil. When $\theta$ is greater, the recording current required for saturation increases. Increased data transfer speed therefore also creates the problem of deterioration in the recording performance, especially in the peripheral region of a magnetic disk where the disk speed is especially high. Furthermore, a large current is needed for recording, and as a result the coil generates heat which causes deformation of the ABS, causing fluctuations in the flying attitude of the slider, so there is a risk of impaired recording performance and less reliability.

Figure 17:
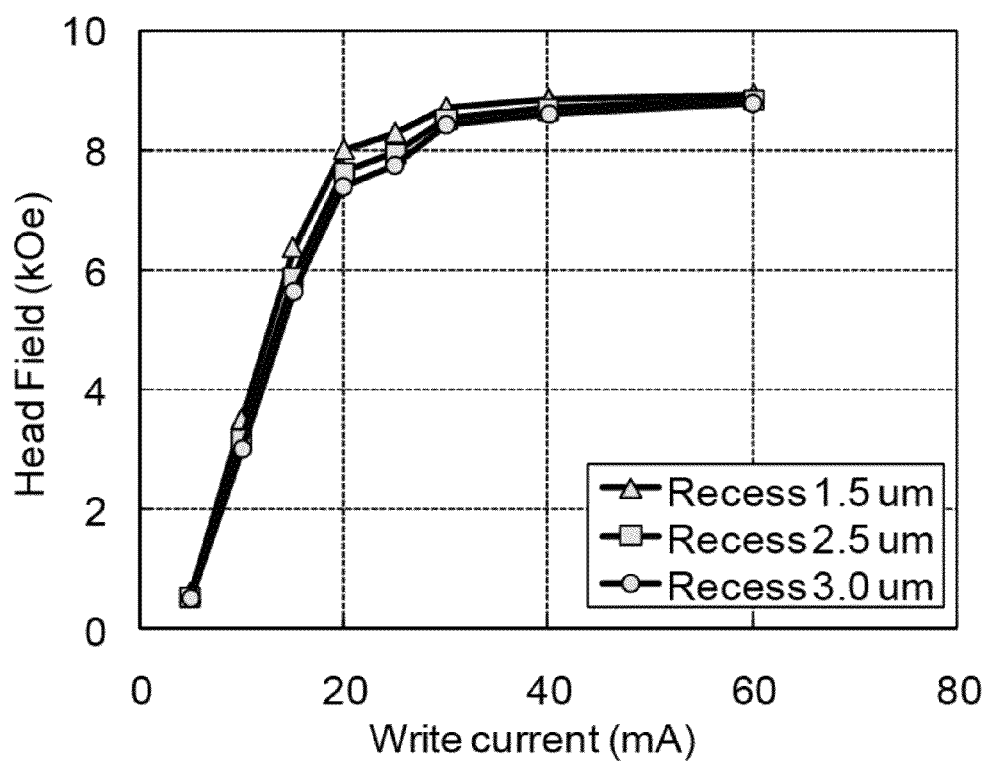
FIG. 17 is a graph illustrating a relationship between write current and write field for magnetic heads having different recess dimensions.
Figure 18:
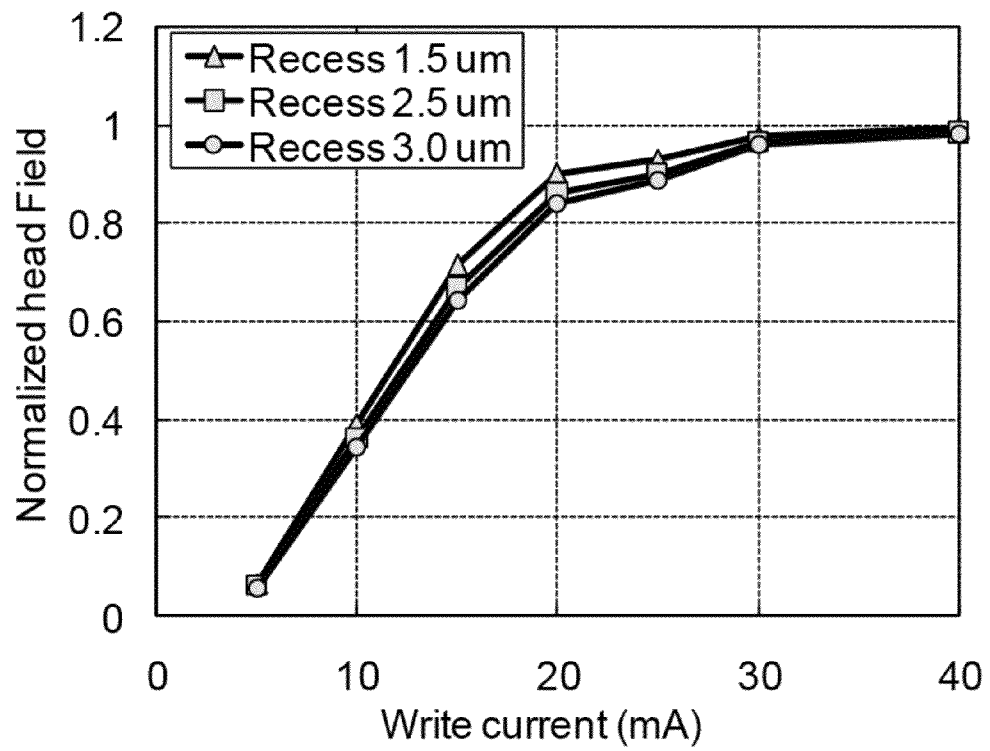
FIG. 18 is a graph illustrating a relationship between write current and normalized write field for magnetic heads having different recess dimensions.
Figure 19:
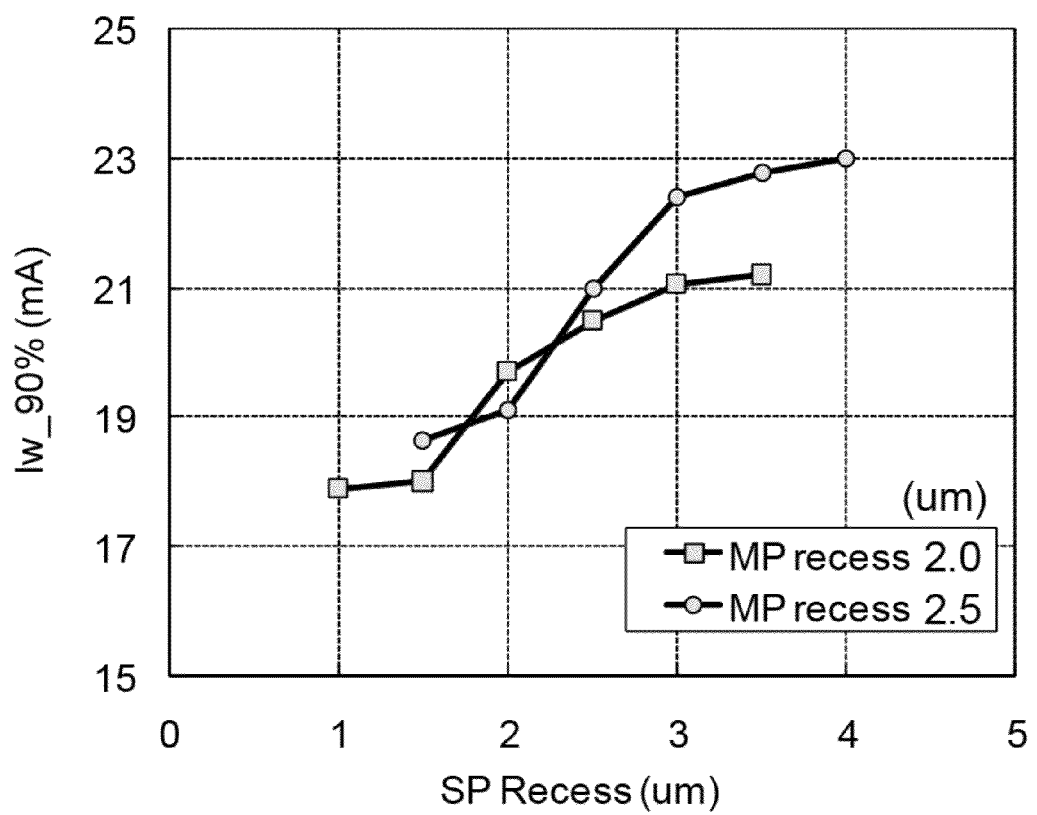
FIG. 19 is a graph illustrating a relationship between sub-pole recess and Iw90 value for write heads with different main pole recess dimensions.
Figure 20:
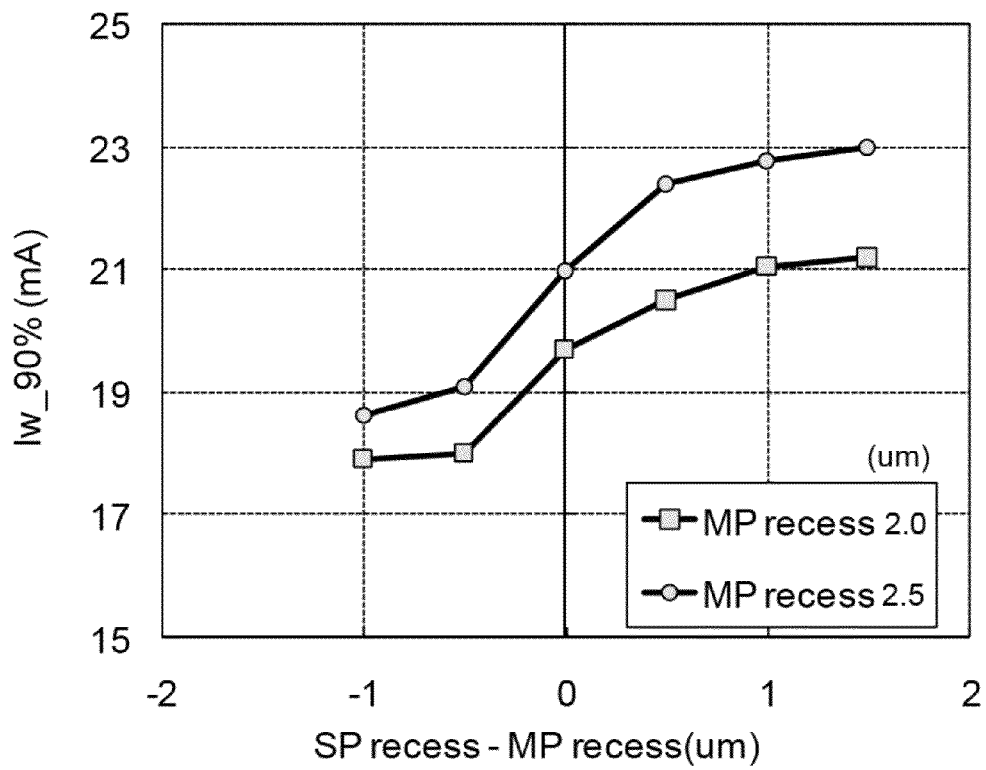
FIG. 20 is a graph illustrating the difference between sub-pole and main pole recess and Iw90 for write heads having different main pole recess dimensions.

The present invention resolves this conflict by forming the shape and location of the sub-pole 322 as described above. With reference again to FIG. 4, the distance between the sub-pole front endpoint 412 and the ABS defines a recess length 414, and the distance between ABS and the stall point of the tapered portion 402 of the sub-pole 322 defines a flare length 416. FIGS. 16 and 17 show the results of investigating the responsiveness of the head field to the recording current when the recess length 414 is varied. As the recess length 414 decreases, the head field rises sharply, as shown in FIG. 17. FIG. 18 shows the current dependency of the head field normalized by the saturation field in each case. The current value at which the normalized field intensity reaches 0.9 is defined as the saturation current value (Iw90). FIG. 19 shows the resulting relationship between the saturation current value and the recess length 414 when the flare length of the main pole 320 is varied at 2.0 μm and 2.5 μm. As the recess length 414 of the sub-pole 322 becomes smaller, the responsiveness of the magnetic field to the recording current improves. Here, the difference between the recess length 414 and the flare length 416 is shown on the horizontal axis in FIG. 20, and it is clear that when the recess length 414 is smaller than the flare length 416 there is a significant Iw90 reducing effect. This can be understood as relating to the convergence of the magnetic flux in the main pole 320. That is to say, when the tapered structure of the sub-pole 322 is positioned further away from the ABS than the tapered start point of the main pole 320, the magnetic flux supplied from the end of the sub-pole 322 dissipates in the cross-track direction because the main pole 320 is wide in the cross-track direction. Magnetic flux can therefore be effectively supplied to the end of the main pole 320 by putting the end of the sub-pole 322 closer to the ABS than the taper start point, and as a result the responsiveness of the head field to the excitation current improves. If the sub-pole is also provided with a tapered structure as shown, it is possible that the residual magnetization when current is not supplied to the coil will tend to be oriented in a direction perpendicular to the ABS. However, in this case the sub-pole 322 is not exposed at the ABS, so there is little chance of erasure occurring after recording. The present invention, therefore, makes it possible to produce a head field which has good tracking properties with respect to the recording current, while the possibility of erasure after recording is limited, and the transfer performance and reliability can be ensured.

It should be pointed out as well, that the sub-pole 322 does not need to have a non-flared portion 410 as shown in FIG. 4. For example, the same effect can be achieved if the sub-pole 322 has a triangular or trapezoidal shape, provided that the end position where the magnetic flux is concentrate is closer to the ABS than the taper start point of the main pole 320 (the recess 414 is less than the distance 416). FIGS. 6-12 show examples of various possible embodiments that can fall within the scope of the invention.

Figure 6:
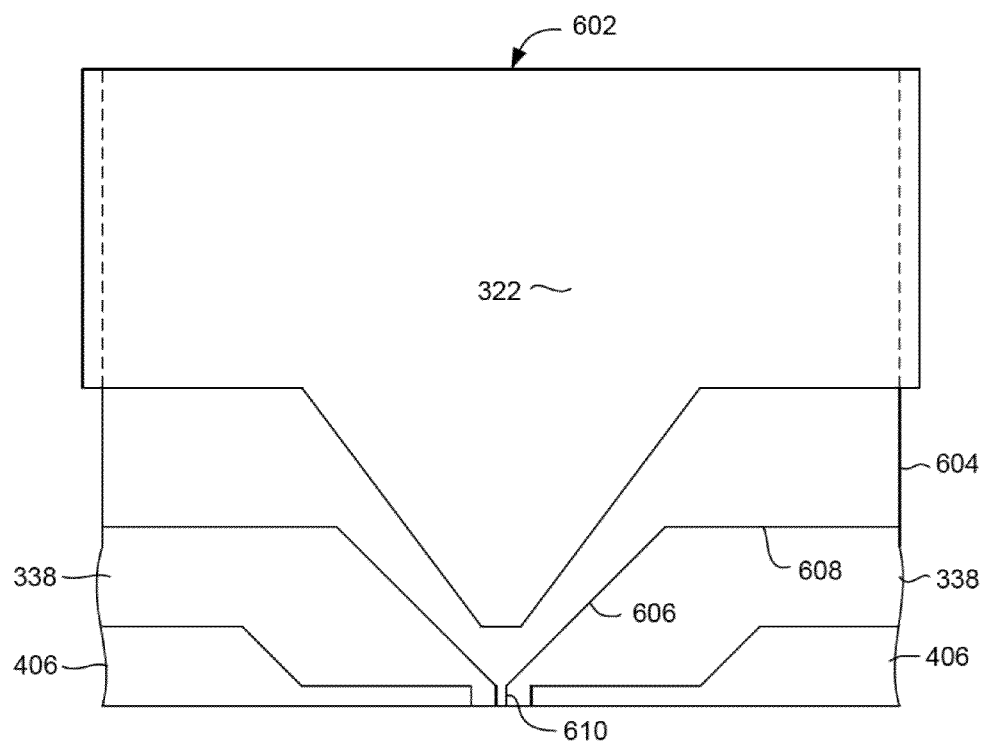
FIGS. 6-12 are top down views similar to that of FIG. 4 for various alternate embodiments of the invention.

FIG. 6 shows a magnetic write head 602 that has a sub-pole 322 that is configured similar to that described above with reference to FIG. 4. However, the head 602 includes a main write pole 604 that has a flared portion 606, a non-flared portion 608 and also has a pole tip portion 610 that has a substantially constant width. This pole tip portion can be helpful in controlling the write pole width, when accurate location of the ABS (such as by lapping) cannot be precisely controlled. In the embodiment of FIG. 4 the taper of the main pole 320 begins right at the ABS, so any variation of the location of the ABS during fabrication will affect the width of the write pole 320 at the ABS as seen from the view of FIG. 5. The embodiment of FIG. 6 helps to maintain a desired pole width at the ABS even if the location of the ABS varies slightly, because the location of the ABS can move while still being within the constant width portion 610.

Figure 7:
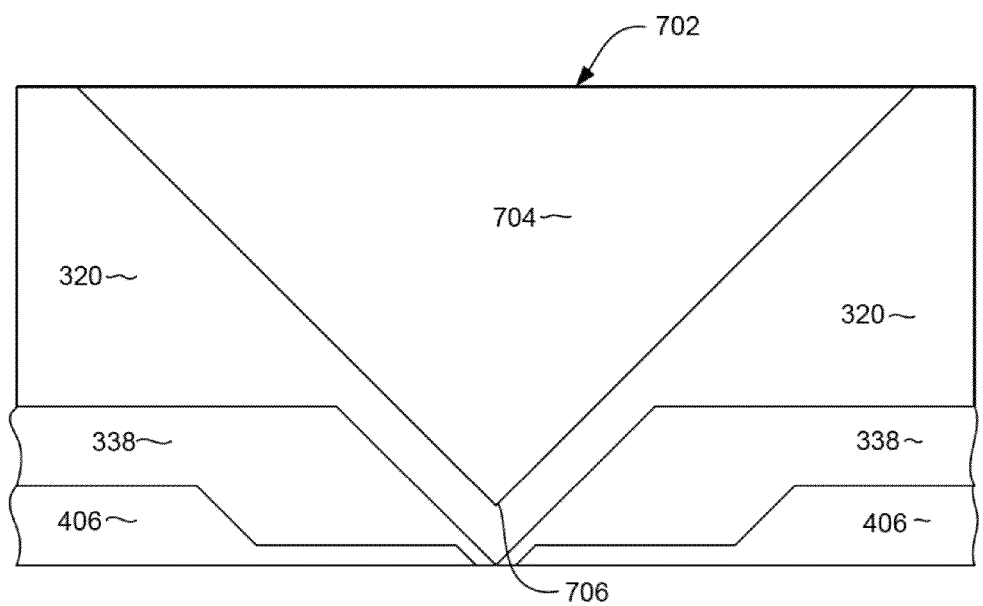

FIG. 7 shows a write head 702 that has a magnetic sub-pole 704 that has a triangular shape. That is, the recessed tip 706 of the sub-pole comes to a point (rather than being blunt as shown in FIG. 4) and the sub-pole 704 does not include the non-flare portion 410 of the embodiment of FIG. 4. Also, as shown in FIG. 7, the sub-pole 704 tapers at an angle that is substantially the same as the taper angle of the main pole 320.

Figure 8:
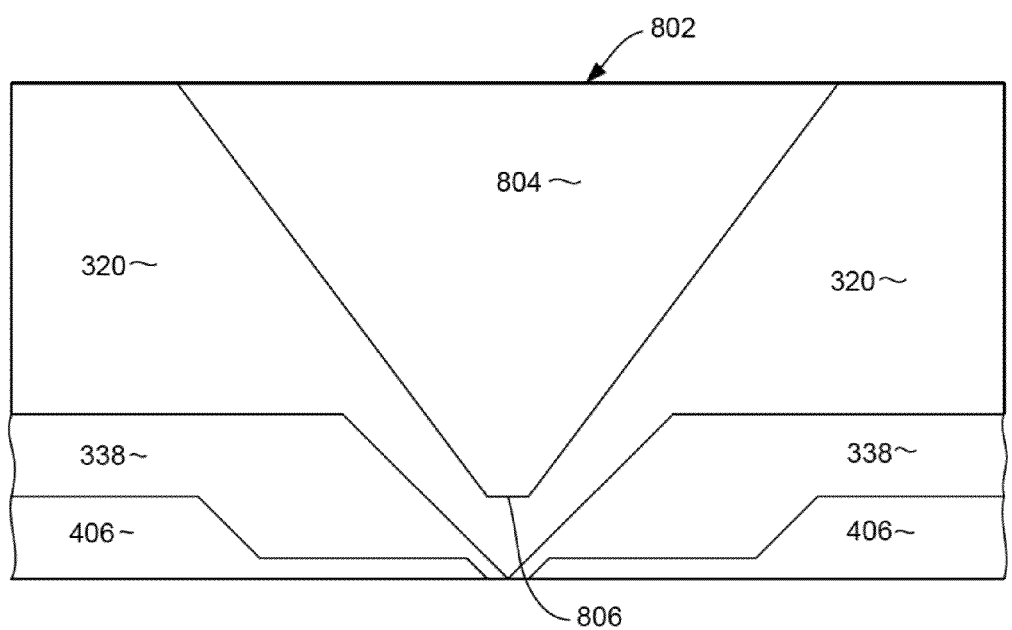

FIG. 8 shows an embodiment formed as a write head 802 that has a trapezoidal shaped sub-pole 804 that has a blunt front end point 806 formed similar to the embodiment of FIG. 4. As with the embodiment of FIG. 7, though, the sub-pole 804 of FIG. 8 does not include a non-flared portion such as the non-flared portion 410 of FIG. 4.

Figure 9:
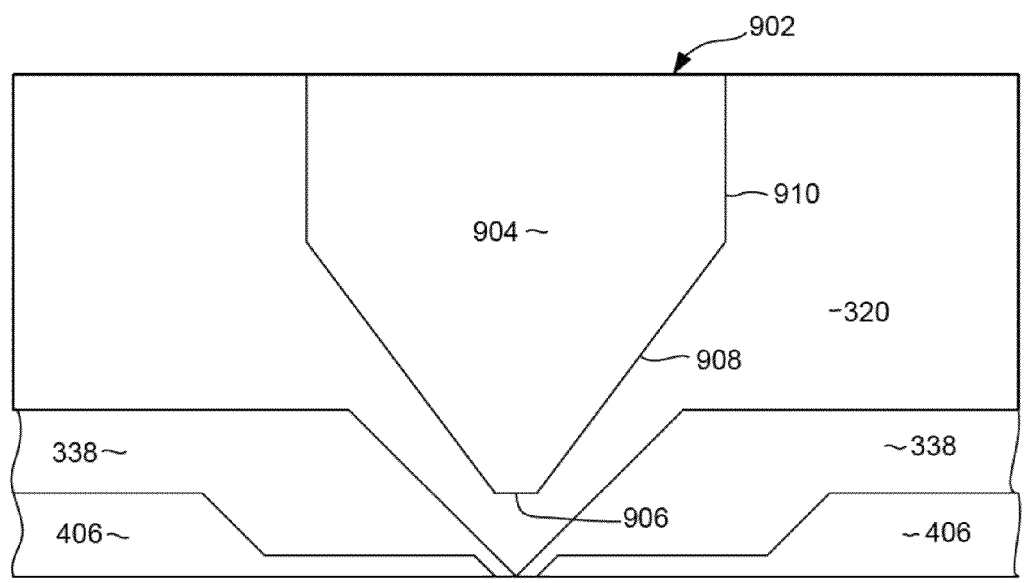

FIG. 9 shows still another possible embodiment. In FIG. 9, the write head 902 has a sub-pole 904 that has a blunt front end 906. However, rather than having a non-tapered portion that has a front edge parallel with the ABS (as in the case of FIG. 4), the sub-pole 904 of FIG. 9 has a non-flared portion 910 with an edge that is perpendicular to the ABS. In other words, the sub-pole 904 transitions directly from a flared tapered portion 908 to sides 910 without having a side extending portion.

Figure 10:
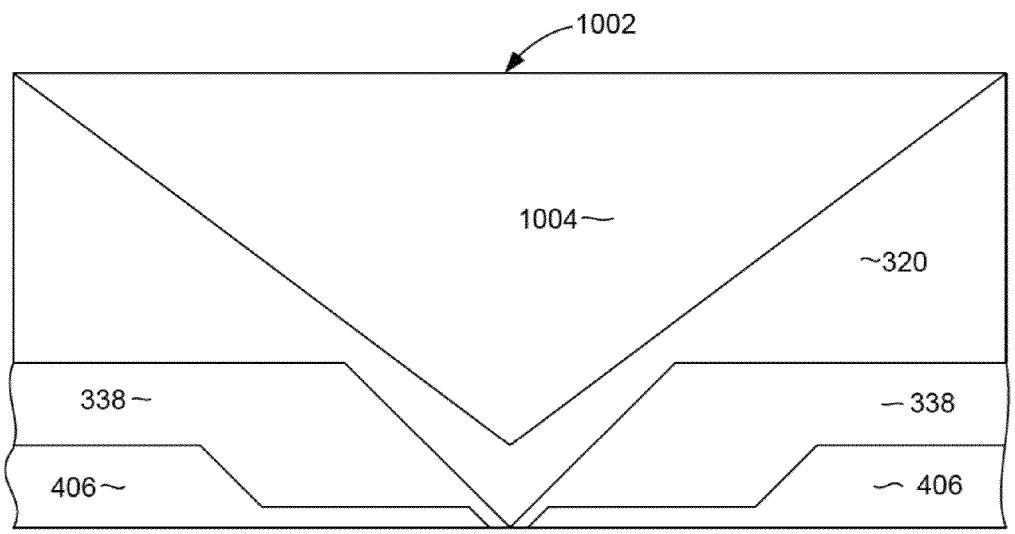

FIG. 10 illustrates still another embodiment of the invention. In FIG. 10, the write head 1002 has a sub-pole 1004 that has a tri-angular shape wherein the sub-pole tapers at a smaller angle relative to the ABS than does the write pole 320. In other words, the angle of inclination of the sub-pole taper relative to a plane that is perpendicular to the ABS is larger than the angle of the main pole taper relative to such a plane. In addition, the sub-pole 1004 comes to a point at its frontmost point.

Figure 11:
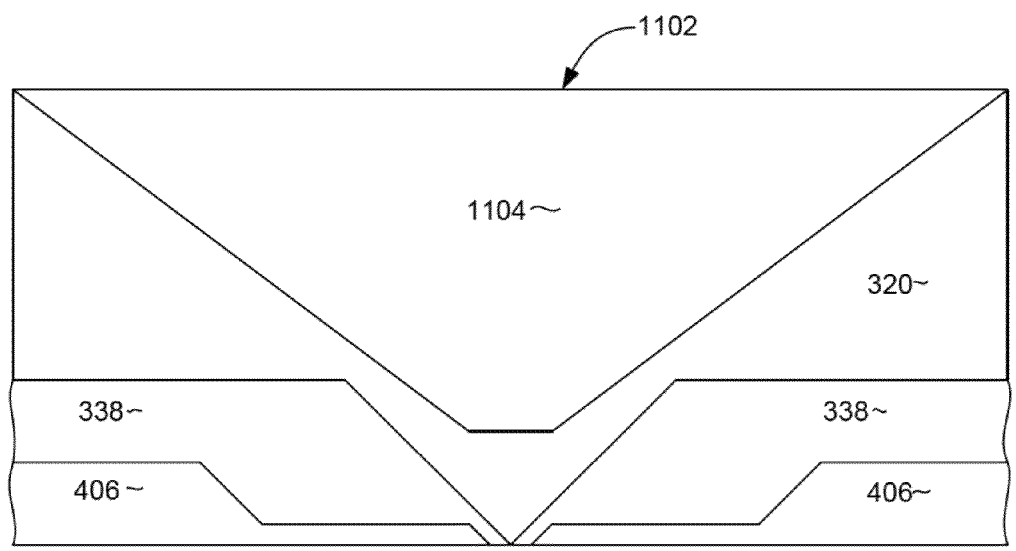
Figure 12:
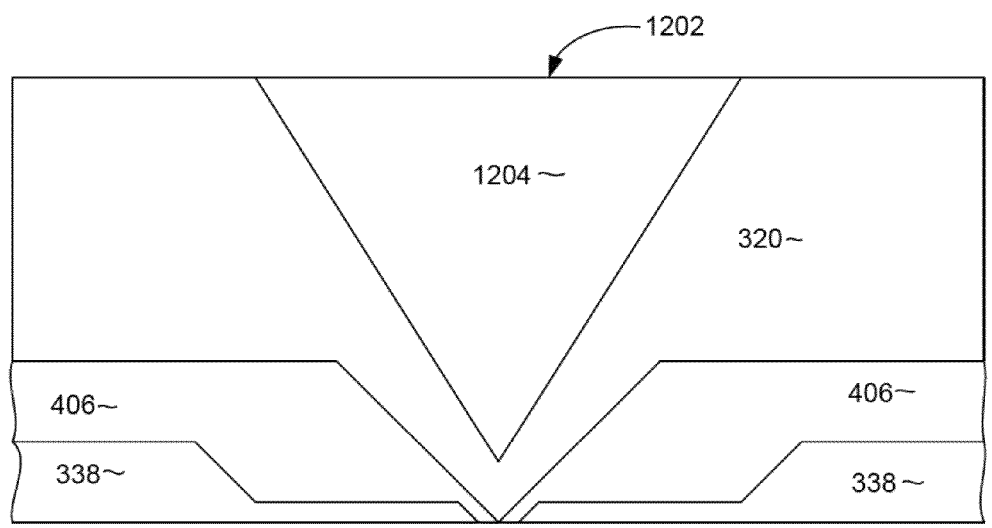

FIG. 11, shows a write head 1102 having a sub-pole 1104 having a taper angle similar to that of FIG. 10. However, the sub-pole 1104 of FIG. 11 has a flat, blunt front-most point. FIG. 12 shows still another write head 1202 having a sub-pole 1204 with a tri-angular shape having a front end that comes to a point similar to the sub-pole 1004 of FIG. 10. However, the sub-pole 1204 has a taper angle that is smaller relative to the ABS than that of the main write pole 320.

Figure 13:
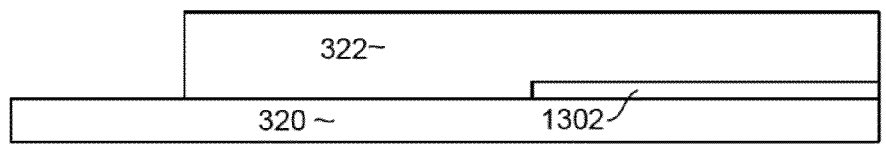
FIG. 13 is a side cross sectional view of a main pole and sub-pole according to an alternate embodiment.
Figure 14:
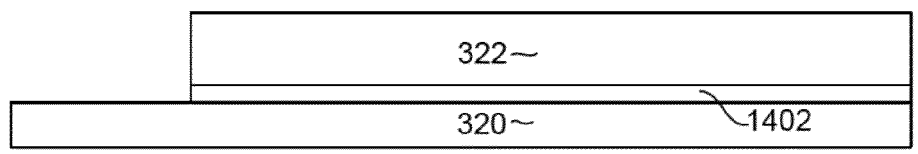
FIG. 14 is a side cross sectional view of a main pole and sub-pole according to still another embodiment of the invention.

It should also be pointed out that, while FIG. 3 shows the sub-pole 322 being magnetically and physically connected with and contacting the main pole 320, the sub pole and main pole can be partially or entirely disconnected from one another by a thin non-magnetic layer there-between. For example, FIG. 13 shows a side cross section of a main magnetic write pole 320 and a magnetic sub-pole 322. A thin non-magnetic layer 1302 such as alumina is disposed between a portion of the main and sub poles 320, 322 so that a portion of the poles contact one another while another portion are separated from one another by the non-magnetic layer 1302. In addition, FIG. 14 shows an embodiment wherein the main pole 320 and sub-pole 322 are entirely disconnected with one another by a non-magnetic layer 1402 such as alumina disposed there-between.

Figure 21:
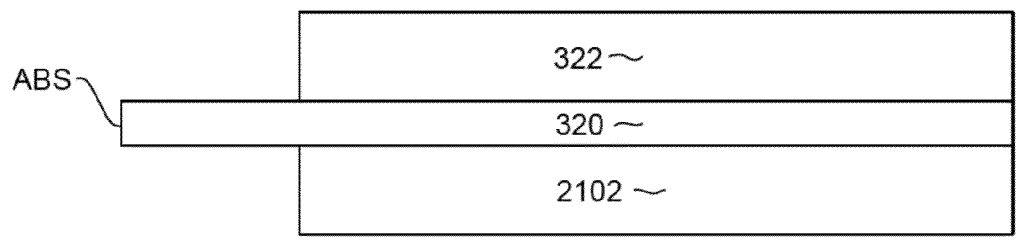
FIG. 21 is an enlarged side cross-sectional view of a main pole and sub-poles according to still another embodiment of the invention.

In addition, the write head 302 can include more than one magnetic sub pole. As illustrated in FIG. 21, the write head can include a main magnetic write pole 320 having first and second sides (top and bottom sides in FIG. 21) and having a first magnetic sub-pole 322 formed adjacent to the first side of the main magnetic pole, and further comprising a second magnetic sub-pole 2102 formed adjacent to the second side of the main magnetic pole. As with the previously described sub-pole 320, the second magnetic sub-pole extends to a point that is between the non-flared portion of the main magnetic pole 320 and the air bearing surface. In addition, the second magnetic sub-pole 2102 could have any of the various configurations described above for the magnetic sub-pole 320.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
a main magnetic write pole that extends to an air bearing surface and that has a flared portion near the air bearing surface and a non-flared portion away from the air bearing surface; and
a magnetic sub-pole having a flared portion and adjacent to the main magnetic write pole and that terminates at an endpoint that is recessed from the air bearing surface, but that is closer to the air bearing surface than is the non-flared portion of the main magnetic write pole;
wherein the flared portion of the sub-pole has a taper angle measured relative to the air bearing surface that is greater than a taper angle of the flared portion of the main magnetic write pole; and
wherein the non-flared portion of the write pole extends laterally outward having a front edge that is substantially parallel with the air bearing surface.

2. The magnetic write head as in claim 1 wherein the flared portion of the magnetic sub-pole terminates at the endpoint that is recessed from the air bearing surface but is closer to the air bearing surface than is the non-flared portion of the main magnetic write pole.

3. The magnetic write head as in claim 1 wherein the magnetic sub-pole contacts the main magnetic write pole.

4. The magnetic write head as in claim 1 wherein a portion of the magnetic sub-pole is separated from the main magnetic write pole by a thin layer of non-magnetic material and a portion of the magnetic sub-pole contacts the main magnetic write pole.

5. The magnetic write head as in claim 1 wherein the magnetic sub-pole is formed adjacent to the main magnetic write pole but is separated from the main magnetic write pole by a layer of non-magnetic material sandwiched between the magnetic sub-pole and the main magnetic write pole.

6. The magnetic write head as in claim 1 wherein the flared portion of the magnetic sub-pole is near the air bearing surface and the magnetic sub-pole has a non-flared portion away from the air bearing surface.

7. The magnetic write head as in claim 6 wherein the non-flared portion of the magnetic sub-pole has an edge facing the air bearing surface that is substantially parallel with the air bearing surface.

8. The magnetic write head as in claim 1 wherein the magnetic sub-pole is a first magnetic sub-pole that is located at a first side of the main magnetic pole, the magnetic write head further comprising a second magnetic sub-pole formed at a second side of the main magnetic pole, the second magnetic sub pole terminating at an endpoint that is recessed from the air bearing surface, but that is closer to the air bearing surface than is the non-flared portion of the main magnetic write pole.

* * * * *

UNITED STATES PATENT AND TRADEMARK OFFICE
CERTIFICATE OF CORRECTION

| | |
|---|---|
| PATENT NO. | : 8,964,331 B2 |
| APPLICATION NO. | : 13/530027 |
| DATED | : February 24, 2015 |
| INVENTOR(S) | : Mikito Sugiyama et al. |

It is certified that error appears in the above-identified patent and that said Letters Patent is hereby corrected as shown below:

In the specification:

col. 6, line 57 replace "stall" with --start--.

Signed and Sealed this
Twenty-third Day of June, 2015

Michelle K. Lee
*Director of the United States Patent and Trademark Office*